United States Patent
Bohling, III et al.

(10) Patent No.: US 10,423,597 B2
(45) Date of Patent: Sep. 24, 2019

(54) DATA SET VISUALIZER FOR TREE BASED FILE SYSTEMS

(71) Applicant: International Business Machines Corporation, Armonk, NY (US)

(72) Inventors: Neal E. Bohling, III, San Jose, CA (US); Roity Prieto Perez, San Jose, CA (US); Helen M. Witter, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 15/081,899

(22) Filed: Mar. 27, 2016

(65) Prior Publication Data

US 2017/0277416 A1 Sep. 28, 2017

(51) Int. Cl.
*G06F 16/22* (2019.01)
*G06F 16/11* (2019.01)
*G06F 16/25* (2019.01)
*G06F 16/245* (2019.01)
*G06F 3/0484* (2013.01)
*G06F 16/16* (2019.01)

(52) U.S. Cl.
CPC ...... *G06F 16/2246* (2019.01); *G06F 3/04847* (2013.01); *G06F 16/11* (2019.01); *G06F 16/168* (2019.01); *G06F 16/245* (2019.01); *G06F 16/25* (2019.01)

(58) Field of Classification Search
CPC ............ G06F 3/04842; G06F 3/04847; G06F 3/0485; G06F 3/04187; G06F 17/3007; G06F 17/30327; G06F 17/30557; G06F 17/30424; G06F 16/2246; G06F 16/11; G06F 16/25; G06F 16/245; G06F 16/168
See application file for complete search history.

(56) References Cited

U.S. PATENT DOCUMENTS

| | | | |
|---|---|---|---|
| 6,873,989 B1* | 3/2005 | Martin, Jr. | G06F 17/30306 |
| 2004/0059755 A1* | 3/2004 | Farrington | G06F 17/30595 |
| 2005/0138150 A1 | 6/2005 | Bhasker et al. | |
| 2014/0344622 A1* | 11/2014 | Huang | G06F 11/079 714/37 |

* cited by examiner

*Primary Examiner* — William L Bashore
*Assistant Examiner* — Gregory A Distefano
(74) *Attorney, Agent, or Firm* — Jeffrey S LaBaw; Feb R Cabrasawan; Tihon Poltavets

(57) ABSTRACT

A method, apparatus and computer program product for performing database maintenance is described. Index information for data stored in a tree based file system running in a computer is received. The file system includes a set of data blocks arranged in logical layers and a set of pointers within the set of data blocks which reference respective data blocks in different logical layers. The received index information is parsed. A model of the file system is built based on the parsed index information. A graphical user interface having an index panel is presented. In the index panel, ones of a plurality of icons respectively represent ones of the set of data blocks and are arranged in layers representing the logical layers.

19 Claims, 12 Drawing Sheets

DATA SET VISUALIZER FOR TREE BASED FILE SYSTEMS

BACKGROUND OF THE INVENTION

This disclosure relates generally to storage system maintenance. More particularly, it relates to storage system maintenance using a graphical user interface.

In computing, a device driver is a computer program that operates or controls a particular type of device that is attached to a computer. A device driver provides one or more software interfaces to hardware devices. The driver enables operating systems, and other computer programs, to access hardware functions of the computer and its peripherals without needing to know precise details of the hardware being used. For example, a storage device driver is used to access the data stored on a computer storage device.

In mainframe operating systems, an analogous mechanism for storage devices is called an access method. An access method is a function of a mainframe operating system that enables access to data on disk, tape or other external devices. Access methods were introduced in 1963 in the IBM OS/360 operating system and provide application programming interfaces (APIs) for transferring data to or from a device. The Virtual Storage Access Method (VSAM) is a DASD access method used to process data in IBM mainframe operating systems. In the early 1970s, the Virtual Storage Access Method (VSAM) was introduced by IBM and was first used in the OS/VS1, OS/VS2 Release 1 (SVS) and Release 2 (MVS) operating systems. Later, it was used throughout the Multiple Virtual Storage (MVS) architecture and now it is used in the z/OS operating system. (IBM, MVS, z/OS are trademarks of the International Business Machines Corporation.) VSAM is a collection of four data set structures: Sequential, indexed, numbered and linear. These structures are combined with other access method software and utilities used on mainframe IBM operating systems.

As one can imagine, the data structures stored in mainframe computers can grow quite complex. Currently, there are limited means for the user to understand and maintain these structures.

BRIEF SUMMARY

According to this disclosure, a method, apparatus and computer program product for performing database maintenance is described. Index information for data stored in a tree based file system running in a computer is received. The file system includes a set of data blocks arranged in logical layers and a set of pointers within the set of data blocks which reference respective data blocks in different logical layers. The received index information is parsed. A model of the file system is built based on the parsed index information. A graphical user interface having an index panel is presented. In the index panel, ones of a plurality of icons respectively represent ones of the set of data blocks and are arranged in layers representing the logical layers.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, the present invention provides a graphical user interface for tree based file structures. An index panel displays the index of the file structure, arranged in a set of layers each of which have a set of icons, e.g., blocks, respectively representing logical blocks of storage in that layer. Selection of one of the blocks will cause highlighting of related blocks (representing other storage areas) in different layers of the file structure. A data panel is used to display information about the data in the storage areas. In preferred embodiments, the data panel displays a set of icons, e.g., blocks, each representing an area of storage on disk. The selection of an icon in either the index panel or the data panel will cause the highlighting and centering of the graphical display for the related icons in the other panel. In preferred embodiments, the logical index search path is highlighted to find a particular block of storage.

Figure 1:
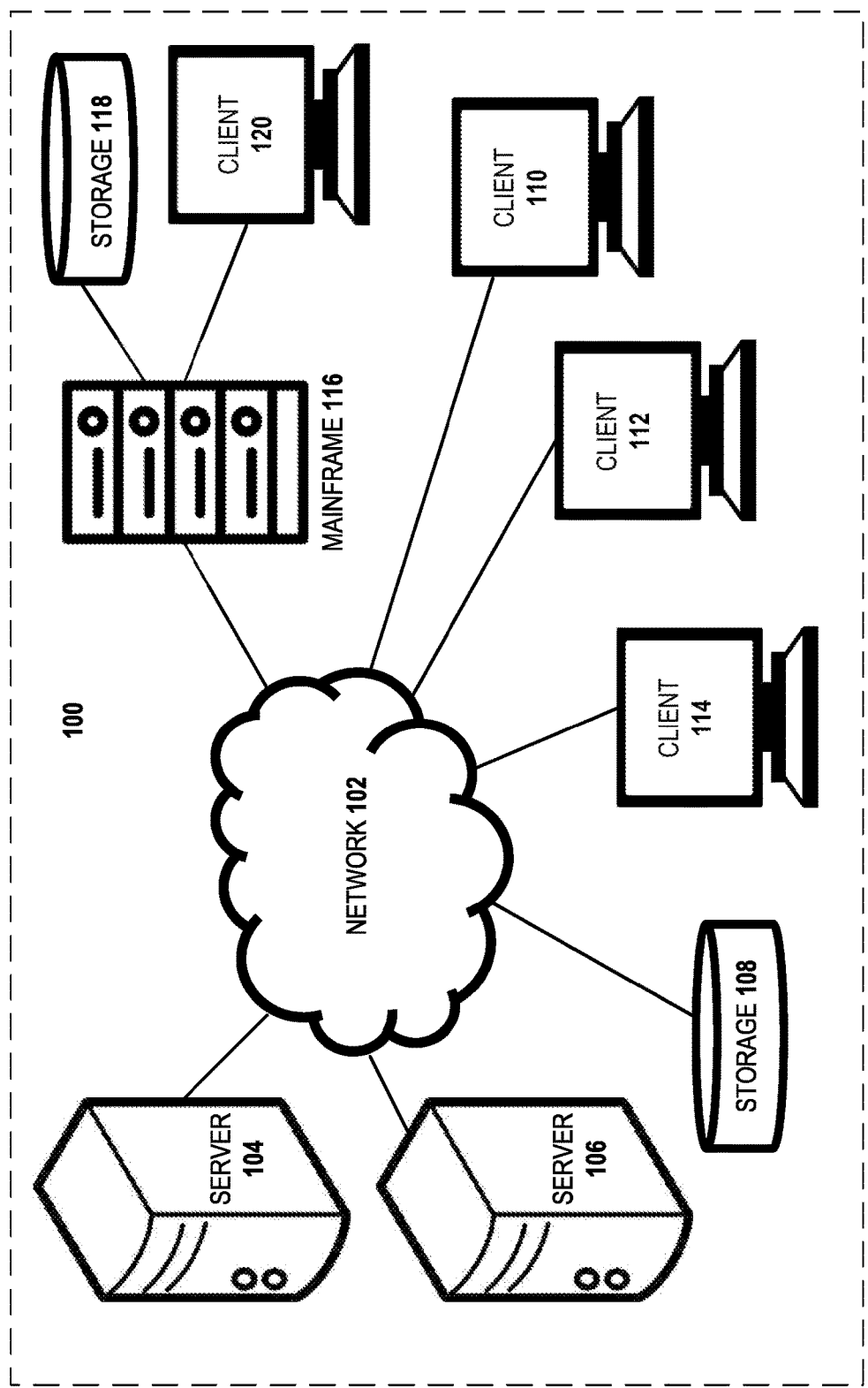
FIG. 1 depicts an exemplary block diagram of a distributed data processing environment in which exemplary aspects of the illustrative embodiments may be implemented.
Figure 2:
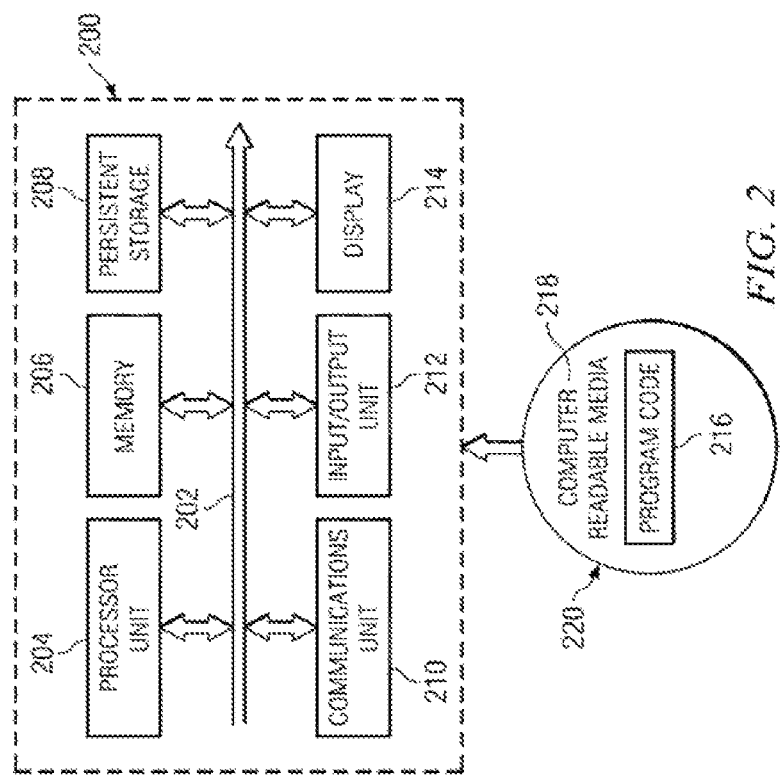
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the drawing, mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Currently, it is very difficult to understand many mainframe file data structures for maintenance and other purposes. For example, when a Key Sequenced Data Set (KSDS) VSAM index and data set structure is used to organize and access the data stored in a storage device, there are no utilities which present a logical representation, either pictorial or graphical, of the data structure to the user. The developer must rely on the information provided by plain text displays, e.g., hex and EBCDIC printouts, statistics reported by LISTCAT reports and IDCAMS tools, to manually calculate how many index levels or how much empty space there is in the data set. None of the reports present all of the data which is needed by the user, and the data is presented in a confusing, albeit detailed, manner. Combining the information from multiple reports and figuring out the missing data necessitates user analysis requiring considerable time and effort. Therefore, the text displays currently available are inadequate for a user or developer to visualize the data set relationships.

The present invention provides a graphical user interface tool to visualize the data index structure which allows users to pinpoint data structure problems. For example, using the present invention would show structural problems such as broken index, out of sequence keys in a CI, etc. Instead of the laborious analysis used in the prior art, these problems will be easily detected by the user.

While the invention is explained below in largely in terms of a VSAM visualizer to display a KSDS VSAM index and data set structure, the present invention can be used with any data structure for a storage device having a similar tree structure.

Three types of record-orientated file structures are used in VSAM, sequential, indexed, and numbered.

A sequential VSAM file structure is called Entry Sequenced Data Set (ESDS). An ESDS access method uses an index defined to enable access via keys. Alternate Index Records defined in ESDS are stored in the order in which they are written by address. Access Records are loaded irrespective of their contents and their byte addresses cannot be changed.

An indexed VSAM file structure is called Key Sequenced Data Set (KSDS). A KSDS access method has two parts: the index component and the data component. The index component and the data component are often stored on separate disk volumes. A basic KSDS only has one key field (the primary key). However, an Alternate Index is defined to permit the use of additional fields as secondary keys. An Alternate Index is itself a KSDS. The data structure used by a KSDS is similar to a B+ tree.

A numbered VSAM file structure is called Relative VSAM organization or Relative Record Data Set (RRDS and VRRDS). An RRDS is accessed by record number and the records are fixed eliminating the need for an index. A VRRDS has an index defined to it to but access is still by record number.

A second type of direct access is called Linear VSAM organization or Linear Data Set (LDS). An LDS is an unstructured VSAM dataset with a control interval size of a multiple of 4K. It is used by certain system services.

Of the VSAM data structures, the invention is most useful with KSDS and VRRDS since they use a tree structure to organize the index. The invention could be used for ESDS and RRDS, but since those do not have a tree based index, the GUI would be limited to the data panel. The data panel described below would be useful to visualize how the ESDS/RRDS is used and if there is significant empty space in the data set. Other file systems which use tree structures include TOPS-20, Apple's filesystem HFS+, Microsoft's NTFS, IBM's AIX (jfs2) and some Linux filesystems, such as btrfs and Ext4.

The physical organization of VSAM data is described below. VSAM data sets are organized in the storage device into control intervals (CI) and control areas (CA). A CA will contain a plurality of CIs. The size of the respective CI and CA is usually determined by the access method used. In the VSAM access methods, there is a fixed number of control intervals within each control area.

A data control interval typically contains a plurality of records. Each record is stored within the control interval starting from the low key upwards to higher keys. Control information is stored at one end of the control interval, usually starting from the high address and moving downwards. The space between the records and the control information is free space. The control information comprises two types of entry: a control interval descriptor field (CIDF) which is always present, and record descriptor fields (RDF) which are present when there are records within the control interval and describe the length of the associated record. Free space within a CI is almost always contiguous.

An index control interval contains a single record that consists of a plurality of entries, free pointers, and control information. The entries within in the index consist of a key value and a relative block address (RBA) pointer. This index value pairs a key to a specific data block. Since each index entry points to a control interval in the data component, the key value stored in the index entry is the highest key that resides in control interval in the data component. This is referred to as the "high key".

When data records are inserted into a control interval, they are placed in the correct order relative to other records. This may require records to be moved out of the way inside the control interval. When a record is deleted, subsequent records are relocated so that the free space remains contiguous.

If there is not enough free space in a control interval for a record to be inserted, the control interval is split. Typically, half the records are stored in the original CI while the remaining records are moved into a new CI. The new control interval is taken from a pool of available control intervals within the same CA as the original CI. If there are no remaining available CIs within the appropriate CA, the CA is split and the CIs are distributed equally between the old and the new CAs.

An important field in the logical record is the key. The key is a subset of the collection of bytes that make up the full record; i.e. the record contains the key. Its contents can be used to retrieve the specific logical record in a random type of access. It identifies the item that is associated with the logical record. There is one key field in the logical record. It is made up of contiguous bytes and it has the same length and relative position in all records for that data set. Each CI holds a set of records with a certain range of keys. The highest of these keys is referred to as the "high key" of the CI. This high key is used by the index to represent the range of keys in that CI. To find the physical location of a record in a KSDS, VSAM creates and maintains an index. This relates the key of each record to the record's relative location in the data set.

The invention provides a way to visualize a VSAM file structure, e.g. a KSDS data set, by providing a graphical representation of the index and (optionally) data set structures. The invention uses a source of the VSAM index and data set structure as input. In preferred embodiments of the invention, the invention uses available sources of this information such as an IDCAMS PRINT or DSS PRINT of the index and data components of the data set as an input. In alternative embodiments of the invention, only a source of the index information is used. The invention provides an interactive diagram of the index structure that will allow users to visualize the index CIs, verify the health of the index structure, navigate through vertical and horizontal pointers, and optionally, display the data portion of the data set. In alternative embodiments of the invention, a source of the catalog entry information is used to display where each data control area (CA) is and the volume on which it resides. In embodiments of the invention, an available source of catalog information such as the IDCAMS LISTCAT command is used as an input to provide this information. Catalog information describes data set attributes and indicates the physical volumes on which a data set is located.

IDCAMS is a mainframe utility which generates and modifies Virtual Storage Access Method (VSAM) and Non-VSAM datasets. IDCAMS was introduced along with VSAM in OS/VS. IDCAMS probably has the most functionality of all the utility programs, performing many functions, for both VSAM and non-VSAM files. Data Set Services (DSS) is another mainframe utility that is primarily a data mover and used to backup, copy, and restore data set. However, one function of DSS is PRINT, which prints the hex equivalent of the actual bytes of data on the disk which makes it useful for the present invention as a source of information.

Preferred embodiments of the invention create visual representations of the VSAM index structures in a Graphical User Interface (GUI) format by using the VSAM index information, and optionally data set structure and catalog entry information. In embodiments where IDCAMS PRINT and IDCAMS LISTCAT commands are used as input, the embodiments parse the output of these commands. In yet further embodiments of the invention, the embodiments will parse data components of the stored data, e.g., the index, data set and catalog information. Using the information, embodiments build internal blocks that represent the index structure, which can then be graphically displayed in a number of ways as is described below.

Using basic index information, the embodiments display the index structure, and key ranges for data CIs. Using the data set and catalog information in addition to the index information, embodiments display more information about the data set, and the data itself. For example, information about volume or CCHH (cylinder-head location on-disk) are shown.

Figure 3:
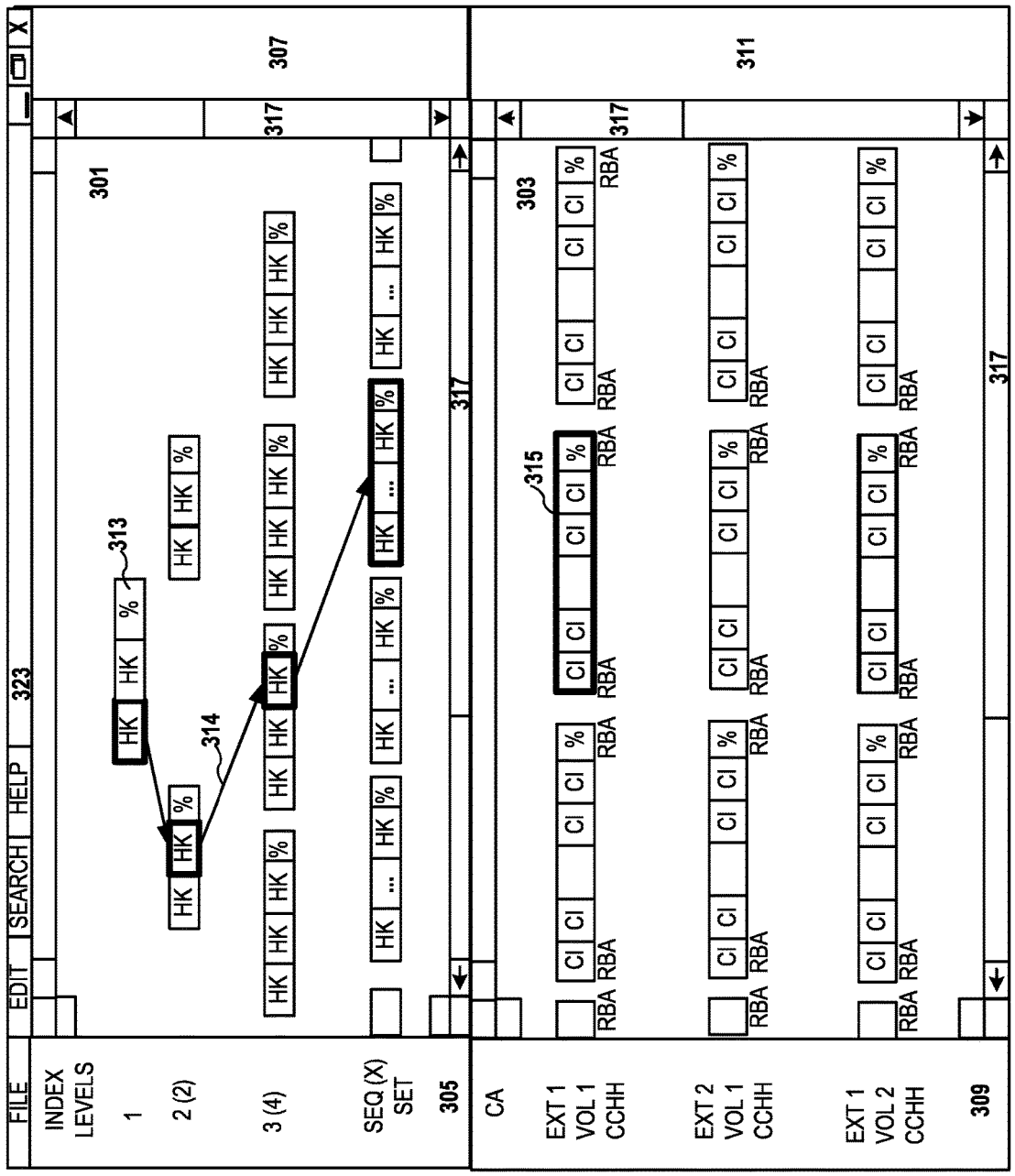
FIG. 3 illustrates an exemplary graphical user interface in which the disclosed subject matter may be implemented.

As shown in FIG. 3, in preferred embodiments of the invention, the main display will be divided into two sections vertically; the top panel will show the index structure, and the bottom panel will show the data. As shown in FIG. 3, the index panel is comprised of central main panel 301, a location reference window on the left 305 and a statistics window on the right side 307. Data panel has a central main panel 303, a location reference window on the left 309, and a statistics window on the right side 311. The location reference windows 305, 309 are used to indicate which data is shown in that row across the central (or main) part of the panel 301, 303. For example, in the location reference window 305 of index panel, the left location identifier is the index level. For each level, all data related to that level will be shown at the same vertical offset across the panel.

Those skilled in the art would appreciate that alternative embodiments of the invention use different arrangements of panels in the user interface such as horizontally arranged panels and other means to indicate the location of the displayed data block and statistics concerning the selected data blocks.

The index panel is now described. It can be seen as the top panel in FIG. 3 and in greater detail in FIG. 4. The main area 301 of this panel shows the index as a set of index layers with each layer having multiple index block icons 313 representing the control intervals (CIs) displayed horizontally. These index block icon 313 representing the CIs are displayed next to each other from left to right. A scrollable display controlled by scroll bars 317 extends as far as necessary to include all index layers and CIs. Although blocks are used as the icon shape, other shaped icons could be used to represent the Cis.

The index level of each layer is indicated on the left side of the display in the "location reference" area 305. In preferred embodiments, the location reference also indicates which level is the sequence set (lowest level). It also shows the number of index blocks, i.e. Control Intervals (CIs) that are in that particular level. For example, in the drawing, the second level reads "2(2) indicating that the second level of the index has two Cis. If, however, the second level of the index has 45 CIs, then the indicator on the left will read "2 (45)". The "2" indicates the index level, and the "45" denotes the number of CIs in that level. Those skilled in the art will recognize that there are other ways to indicate the index level and total number of index blocks within that level.

In preferred embodiments of the invention, each index block 313 representing a respective CI is further divided into sub-sections. One subsection type depicts the horizontal chain to the next index record on the current level. Another subsection type depicts how much free space is left in that CI. The main type of subsection represents the entries for the particular index record. As each CI typically holds multiple entries, there will typically be a plurality of this type of subsection each representing respective records within the index or data component. Each of these entries within that CI includes a relative block value that gives the location of an index CI at the next level of the index. In this way, each index entry at the higher levels "point" representatively to an index CI in the next level of the index. The high key at each level represents a range of keys that are held in the levels below, or in the data component. At the lowest level, or the sequence set, the entry contains the high key and an RBA value of the CI within the data component to which it refers. The high key in that instance is the highest key that is held within the data CI pointed to by that index entry. The second level of index will point downward to sequence set Cis. Each high key in a second level index is the highest key represented in the set of index entries in the CI of the next index level down. The range each key represents is between the high key of the previous entry, and the high key of the current entry.

An index search starts at the highest level, and the index entries within that high-level index CI are scanned. When a key in the index CI is found that is higher than the search key, then that index entry is the correct one to point to the next index level. The second level of index is searched the same way by finding the entry that has a key higher than the search key. This repeats for each level until the sequence set, which then points to the data component CI. Within the data component CI, the records are scanned to find the one that specifically matches the search key.

When an entry representing a particular CI or record within a CI is clicked or otherwise selected, the display will highlight the index chain 314 pointing to that entry, and downward to the next block to which that record points. This index chain indicates which blocks the index would reference when searching for the specified block, as described previously. For example, if the section representing CI #3 within the second-level index list is selected, then the entry in the first level that contains a pointer to the selected second-level CI will be highlighted, and an indicator, such as a line or an arrow displayed from the first-level block to the selected second-level block.

Figure 4:
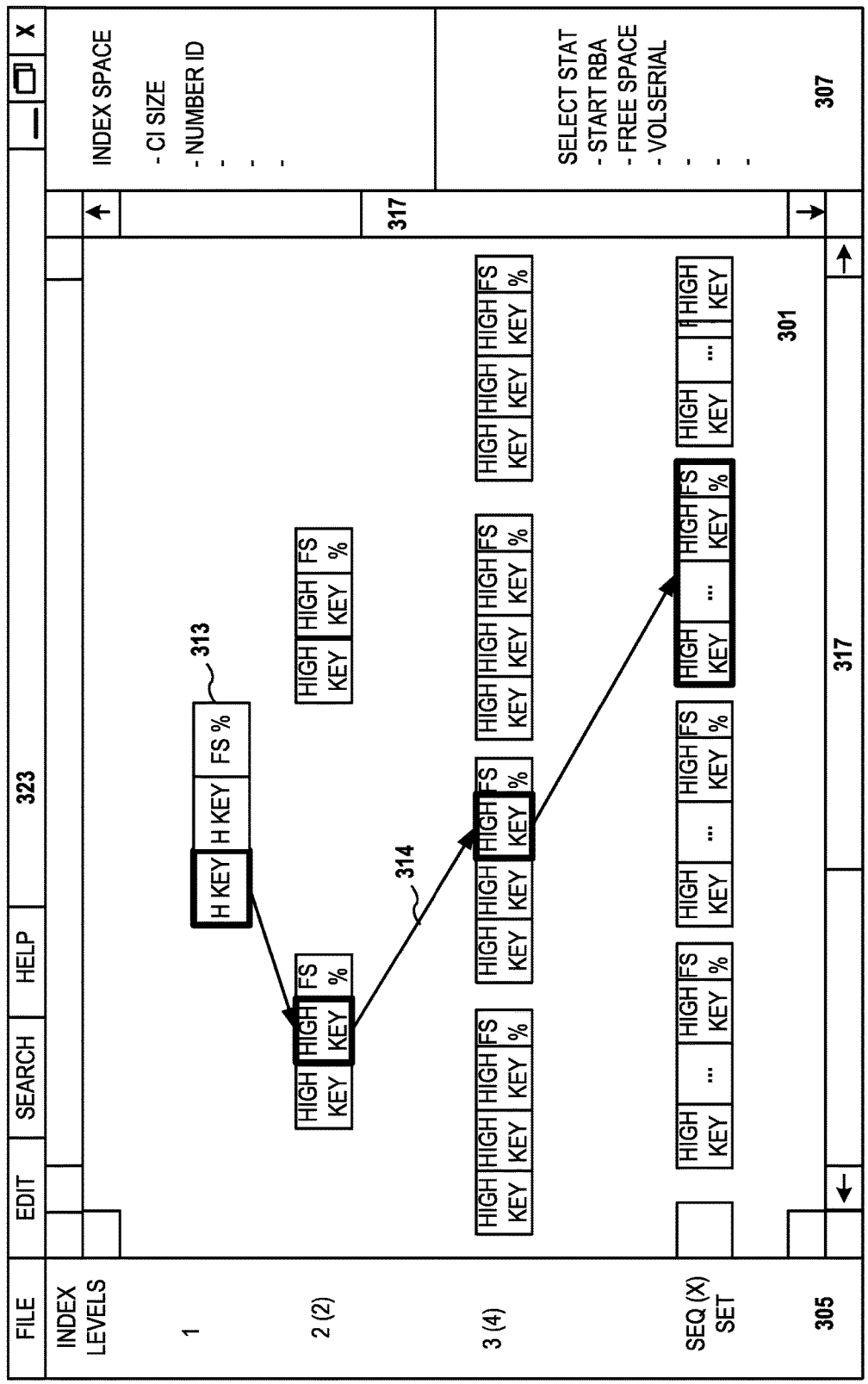
FIG. 4 illustrates an exemplary index view graphical user interface in which the disclosed subject matter may be implemented.

In a preferred embodiment, if a specific subsection representing a entry within that index block was selected, then an arrow will also point downwards from the selected entry to the next level index block to which the selected entry refers. In this way, selecting any index location will give the selection chain 314 leading to that entry, and the chain from that entry to the data. FIG. 4 demonstrates an example of this. In FIG. 4, the third CI in the sequence set was selected. This resulted in a highlighting of the relevant section in the third index level, as well as the relevant sections in levels 1 and 2. This set of linked blocks is the index chain (also called a selection chain) for the purposes of this description. Although the index/selection chain is depicted as a set of arrows linking a set of highlighted index block icons, those skilled in the art would recognize that other means of depicting the index chain such as colors, lines and changing the presentation of the index block icons can be used to indicate the index chain.

In most file systems using VSAM, there will likely be many index blocks, for example, on the order of hundreds or thousands of index blocks per index level. To accommodate this number of index blocks, preferably the index blocks will be displayed in a scrollable window. As shown in the drawing, the index blocks extend horizontally with a scroll bar 317, or similar control, to allow viewing of all of the blocks. In a preferred embodiment, when a selection is made, the selected and highlighted blocks will be auto-centered in the display for easy viewing.

In preferred embodiments, the entire index view in the central panel 301 can be zoomed in or out to show varying amounts of index blocks, from all of the index blocks to a single index block visible in the displayed view. When zoomed out to show all of the index blocks, the blocks representing the CIs will be represented simply; more detail is added as the zoom level increases.

In one preferred embodiment, the information panel 307 displays overall index statistics, and specific statistics for the selected block. The index statistics displayed include similar information to that provided by the IDCAMS LISTCAT command, e.g., control interval (CI) size, number of extents, number of index levels, % DASD Free, % DASD Used, key length and offset, block size, RBA of highest level CI, RBA of first sequence set CI, etc. The information panel 307 will also include a section for statistics related to the selected block, such as volume, extent number, Relative Block Address (RBA), location on volume (CCHH), and key range. In other embodiments of the invention, moving the pointer cursor to the index chain 314 can cause the information panel to be presented as a pop-up panel over a region of the central panel away from the index chain 314.

Figure 5:
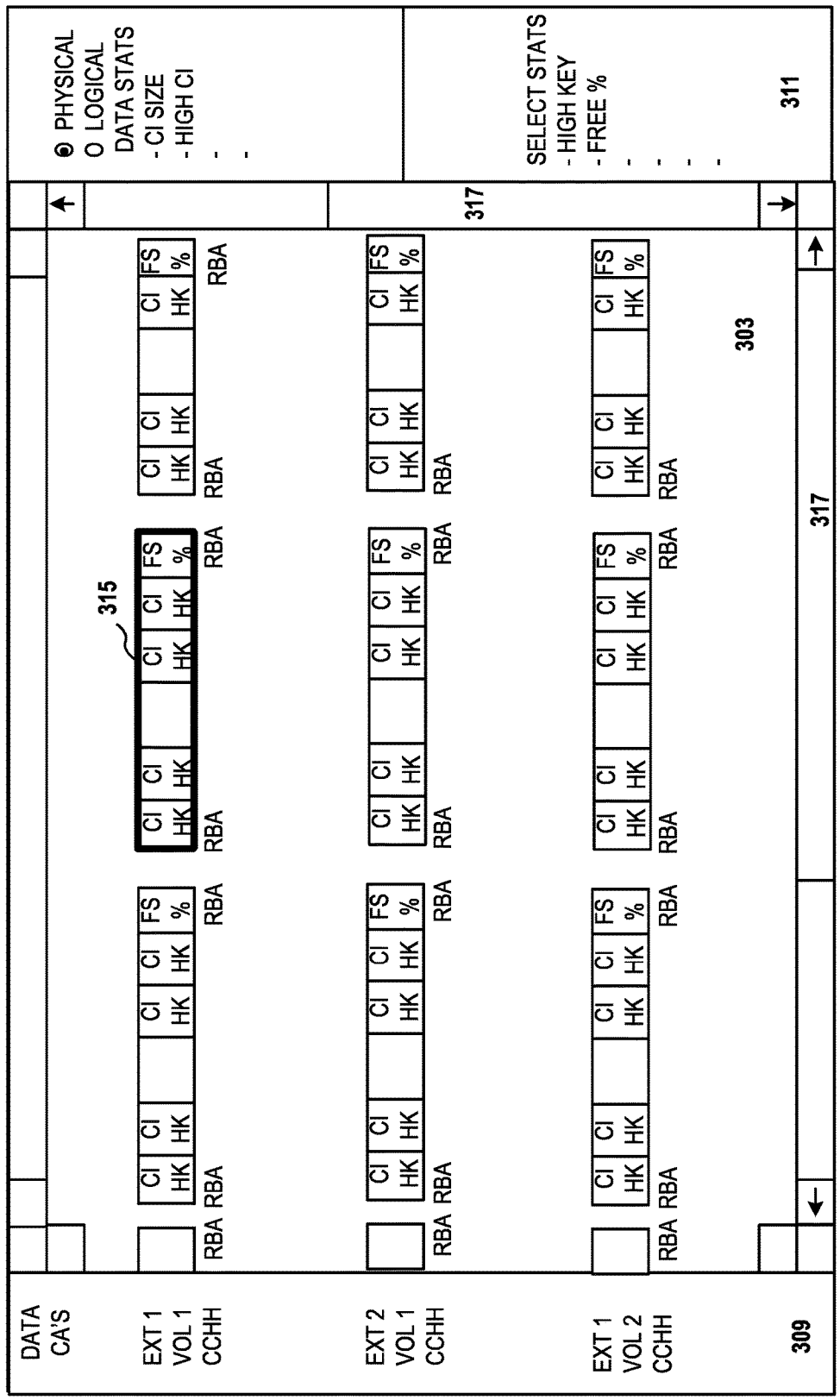
FIG. 5 illustrates an exemplary data view graphical user interface in which the disclosed subject matter may be implemented.

The data panel is now described. In the drawings, it is depicted as the bottom panel in FIG. 3 and in greater detail in FIG. 5. In alternative embodiments, the index and data panels can be displayed side-by-side, or in reverse order. The data panel displays icons representing the data blocks at the Control Area or Control Interval level in the central area 303. In the embodiment, a series of blocks is used, organized either by Key (Logical), or by relative byte address (RBA), i.e. physical order. In preferred embodiments, an indication of how the data blocks are organized, either logically or physical is indicated and selected in the statistics window 311. In FIG. 5, radio buttons are used to indicate the selection of display mode.

When the data panel is in "Physical" display mode, as shown in FIGS. 3 and 5, the data will be organized by volume and extent, sorted by RBA. In VSAM, a primary space allocation is the initial amount of allocated space. When the primary amount on the first volume is used up, a secondary amount is allocated on that volume. Each time a new record does not fit in the allocated space, the system allocates more space in the secondary space amount. The system repeats allocating this space until the volume is out of space or the volume extent limit of 123 is reached. The data CIs will be grouped by extent, such that the volume and extent number are listed on the left, and all CAs/CIs in that extent are displayed in the same row, extending out to the right in a scrollable list. Each CA will show the high key related to that CA, and the CIs within that CI, and their high keys. The RBA for the beginning and end of each CA will also be listed.

Figure 6:
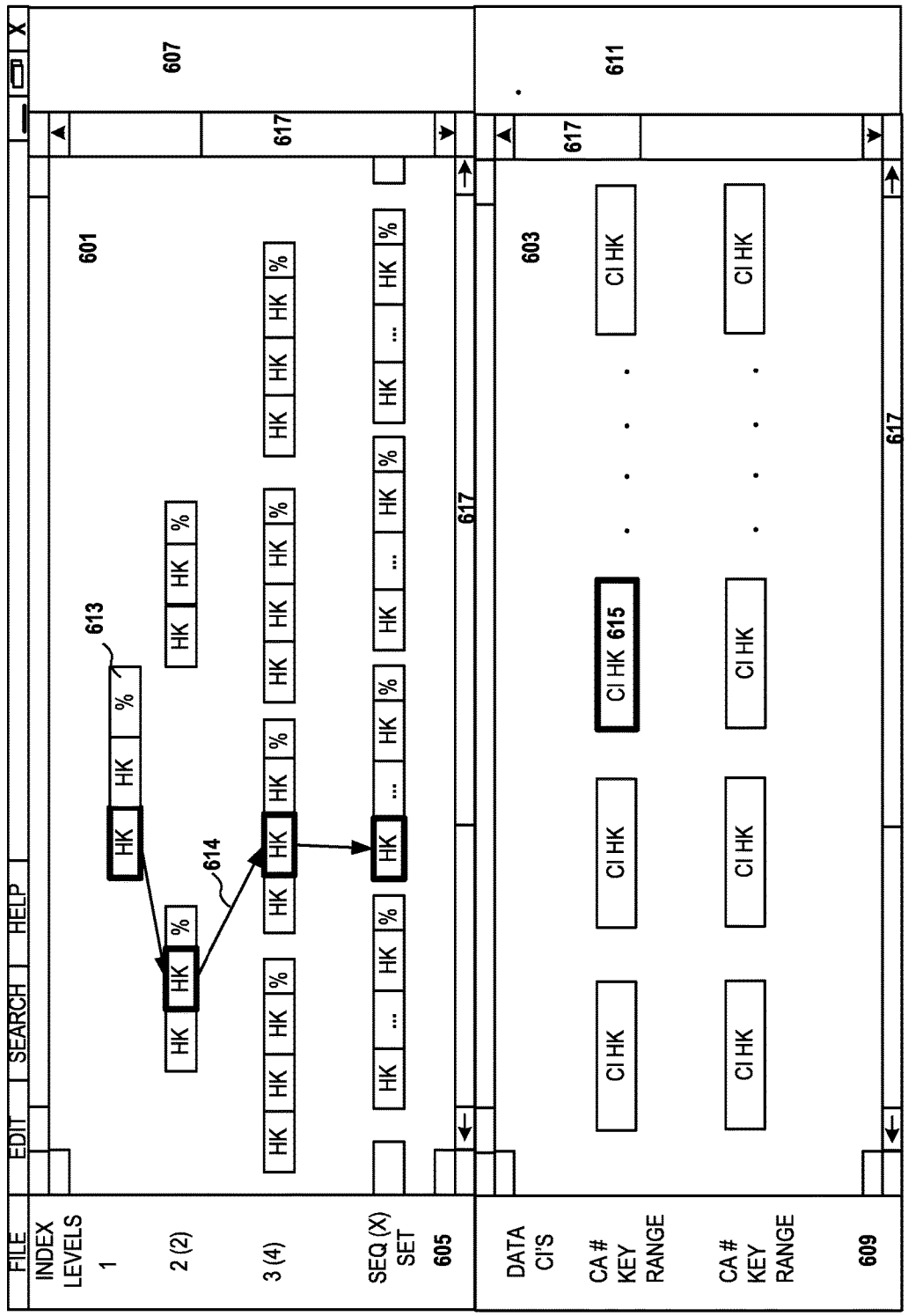
FIG. 6 illustrates an exemplary graphical user interface in which the disclosed subject matter may be implemented.
Figure 7:
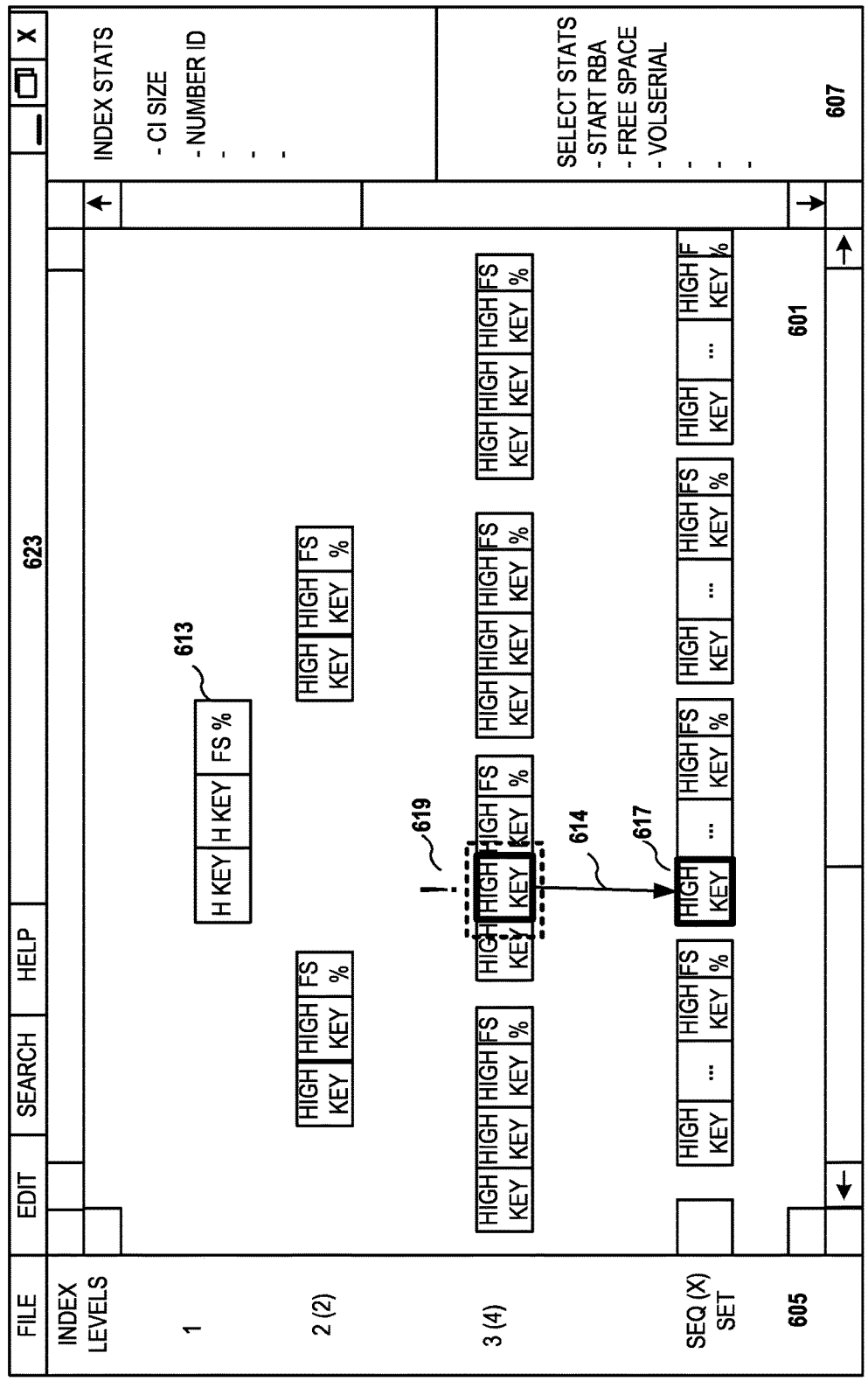
FIG. 7 illustrates an exemplary index view graphical user interface in which the disclosed subject matter may be implemented.
Figure 8:
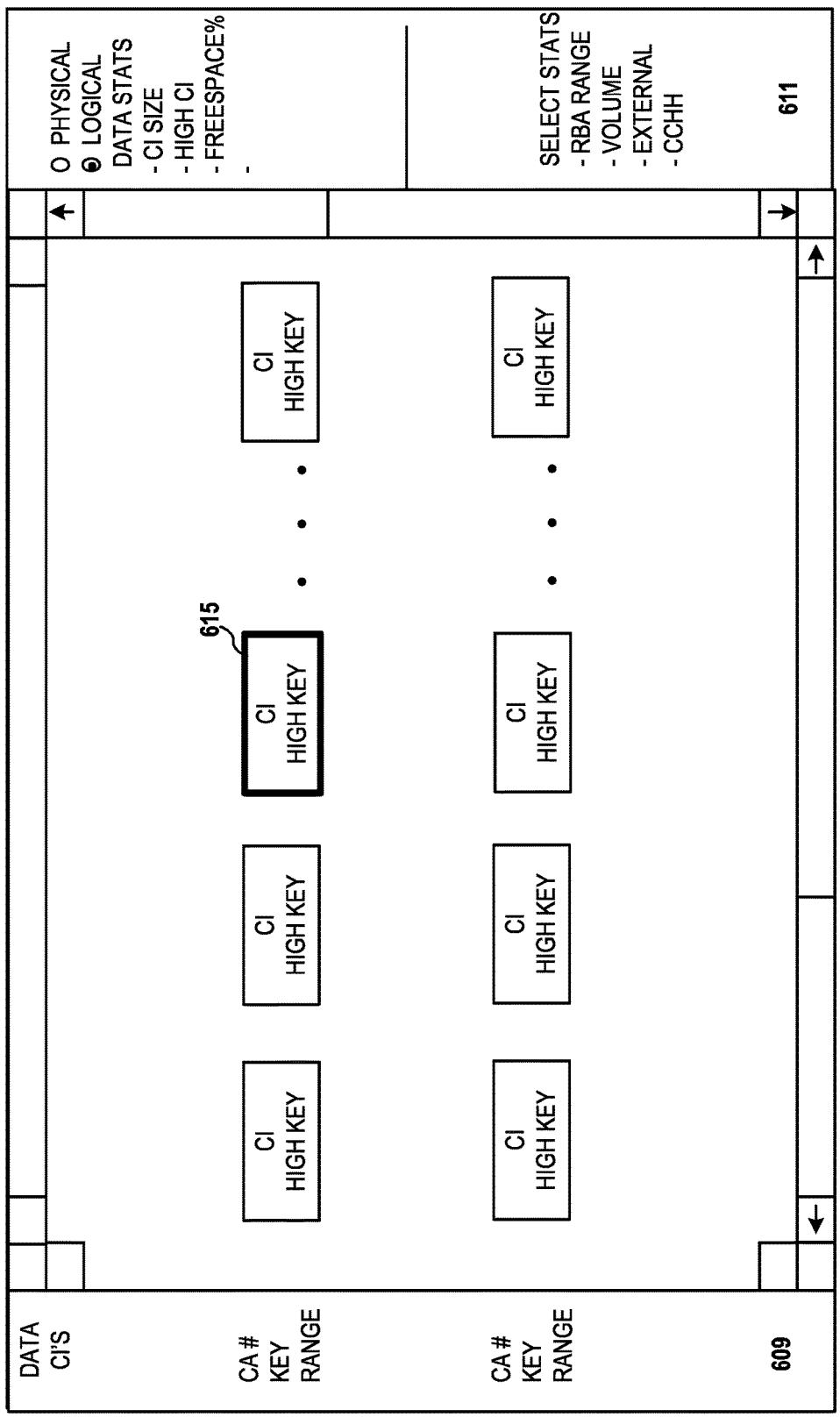
FIG. 8 illustrates an exemplary data view graphical user interface in which the disclosed subject matter may be implemented.

As shown in FIGS. 6-8, when the data panel is in "Logical" display mode, the data CIs will be displayed in key order in the central area 603 of the data panel, with each "line" of the data display showing all CIs for a particular CA. In the location display 609 on the left, each row is by Control Area Number (CA#) and key range. Preferably, CAs, and therefore the CA# and key range, are listed in increasing order. All CIs relating to the respective CA will then be listed from left to right in the main data area 603 in a scrollable format. In a preferred embodiment, the next CA is then displayed vertically below, such that reading the data blocks in a left-to-right, top-to-bottom order produces a key-sequenced order.

In some embodiments, the data panel also includes a "Statistics" display area 611 on the right side, which includes an overall statistics section (Data Stats) and a "Selected Stats" section which has information about the currently selected data block. Once a particular data block is selected, this section will be updated with information such as Key Range, RBA, Volume, CCHH, Extent number, and Freespace.

Like the index view in the top central area 601, the data view in the bottom central area 603 is preferably a zoomable user interface; a user can zoom out to show all blocks, or zoom in to display just a few blocks with a higher level of detail. From within the data panel view 603, the user can double-click on a data block, e.g., data block 615, and the user interface change the statistics window 611. Alternatively, the GUI will pull up a pop-up window that shows the actual data stored within that CI. In some embodiments, the data of the CI is displayed as Hex data and/or EBCDIC data and sorted by key.

In preferred embodiments, the selections in either the index view or the data view affect the display of the other view. For example, when a block is selected in either the index view or data view, the views will be updated to show the upward index selection chain, and downward selection. If a sequence set CI is selected in the data view, the viewer will center and highlight the Data CA that corresponds to that Index CI. Each index step leading up to that sequence set CI will also be highlighted, with arrows drawn from each level to each subsequent level.

Embodiments of the invention add a search function. For example, the search function can be accessed in a menu bar 323, 623. The search function allows a user to enter a Key which the tool will then use to search the index and data portions. The results of this search is that the search path through the index main panel 601 will be highlighted to show how VSAM would do the index search. Each index block 613 at each level that would satisfy the search is highlighted, showing the path 614 from the highest index level to the lowest index level. Searching a Key can be used to help diagnose index problems and demonstrate the index search process.

In preferred embodiments of the invention, a search will also extend to the data component of the data set (if the data set information was provided) and be displayed as a block 615 in the main data panel 603 to ensure that this Key exists within the data component, and that the index matches the data components. If the location indicated by the index search is different than that of the data search, then the problem will be highlighted and user informed of the problem. In a preferred embodiment, the user would be notified by highlighting the icon representing the data CI, e.g., with a bold dashed red line, or an icon indicating a problem, such as a red circle with an '!' in the middle. Other options would be have a pop-up window or alert area that described any errors that were found. The message would indicate that the location pointed to by the index does not match the location found in the data set, indicating possible corruption of the data set.

For example, if the user searched for key AAAA, and this key was not found in the index, but was found in the data, then the invention would highlight the problem data block (for example, block 615 in FIG. 6) with a bold red line and the "alert" icon. Nothing would be shown in the index panel, because the index search did not work for that key. Alternatively, if the index search provided a path through the index, such as starting at icon 613 and path 614 in FIG. 6, but the location of the data block represented by icon 615 differed from the index path that path 614 represented, then icon 615 would again be highlighted and the alert icon shown. Clicking the alert icon would provide a window or message showing that the data CI location did not match index pointer.

As an example, the Visualizer can show a broken index path is one where one of the vertical pointers that point from a higher level to a lower level does not exist, resulting in orphaned index blocks with no pointers to it. This would be shown in the visualizer in two ways as shown in FIG. 7. Clicking on an icon 617 representing a lower-level index CI normally creates highlighted links upwards through the index to show the search path 614. If a vertical pointer is missing, the highlighting would fail to proceed to the top of the index, as shown, and the program would check that a complete search path was available. If the entire search path is not available, a message (special highlighting, pop-up, alert, or message in a notification area) would be presented to the user stating that the search path is incomplete. In the drawing, exclamation point icon shows a broken index path.

For out of sequence keys within a CI, this application would check the sequence during display, and if the keys were found to be out of sequence, the problem would be highlighted and the user notified. One possible method of highlighting would be to add a highlighting in bold dashed red line with an alert icon. Clicking on the icon will provide additional details, e.g., in a pop-up window, related to the error.

In embodiments of the invention, the information window and the statistics window are combined in a single window. Those skilled in the art would recognize that the information presented in these panels is exemplary, and the data presented will depend on the file structure being visualized and the design requirements of the interface. Other data will be presented in other embodiments of the invention.

In preferred embodiments of the invention, a set of tests are performed to determine the integrity of the structure of the VSAM index and data component. Such checks include, but are not limited to:
  Key order
  Sequence set/data CA mismatch
  Orphaned CA
  Horizontal pointer chain loops
The test interface is modular such that additional checks can be built to extend the testing functionality.

The ways in which users would interact with embodiments of the invention would include viewing their VSAM data set and assessing how their well their configuration is working and assessing an index search path to look for problems and usage characteristics. By viewing the graphical user interface, users can answer questions about their VSAM data sets like:
  Is there enough FREESPACE coded?
  Are the sizes of the blocks (CISIZE) appropriate for my data?
  Are there orphaned control areas (CAs)?
  How well is the data dispersed throughout the VSAM data set?
  Why is a particular key not found in this data set?

The information provided in the highlighted blocks in the central areas and in the statistics information panels on the right would allow the user to assess how full those blocks are, and where those blocks reside on disk storage. If the user finds that many of his control intervals have a high percentage used, then he could consider increasing the FREESPACE parameter to allow more free space or increase the CISIZE to accommodate more data in each block.

The graphical user interface would also reveal where in the logical data set the bulk of the data was being stored. For example, if the user found that many of the inserted records were "clumping" in the middle of the data set, this could mean that they might encounter performance problems when using this data set on the live system. Identifying the data clumping will allow the user to change index parameters and possibly run a reorganization job to layout the index again with a more dispersed data indexing.

The data portion of the display would show if there are any orphaned Control Area blocks or Control Interval blocks. These blocks would be data blocks that the index does not reference. If the user finds a large number of these blocks, they would then know that it is time to run a job to reorganize (IDCAMS REPRO) to reclaim that wasted space, and possibly turn on the VSAM CA RECLAIM option. Embodiments of the invention would identify orphaned CA or CI blocks and recommend both options to the user via a "recommended actions" pop up or message.

Embodiments of the invention will also allow a user to trace the index search path for a specific record key. A key is the identifier included in the data that the index uses as a reference tool when indexing the data records. The keys are organized in a tree structure in order to minimize search time when looking for a particular key. Using this embodiment, a user can select portions of the index tree, and the tool will tell them the key ranges associated with that block inside the logical index tree structure. To solve the question of how a particular key is found (or cannot be found), the user can click through the index and compare the keys therein. Additionally, embodiments of the invention would provide a search feature, where the user could simply enter the key in question, and the tool would calculate and highlight the search path through the index tree that VSAM would use to find the provided key. In the case where a key is not found, the graphical user interface would show where in the index the search algorithm failed. The tool would also highlight any block in the data panel where that key would reside. This allows the user to see if the index is broken (does not point to that data block), or if the key simply does not exist in the data set.

The tool could also detect problems within the index itself in the vertical and horizontal pointers. The tool will help identify these situations by highlighting those index blocks with no reference from a higher level or horizontal level (much like orphaned blocks in the data area). In those situations, the tool would again recommend an IDCAMS REPRO job to reorganize the data set. This tool will suggest actions, which other utilities will perform (IDCAMS REPRO to do the reorganization.

While many different embodiments are within the scope of the invention, the invention could be implemented in either of two different modes. The first mode, the "remote" mode, would not provide direct access to the VSAM data set, and so representative data must be provided as input. The second mode, referred to as the "local" mode, would allow the Visualizer direct access to the VSAM data set to be displayed.

Figure 9:
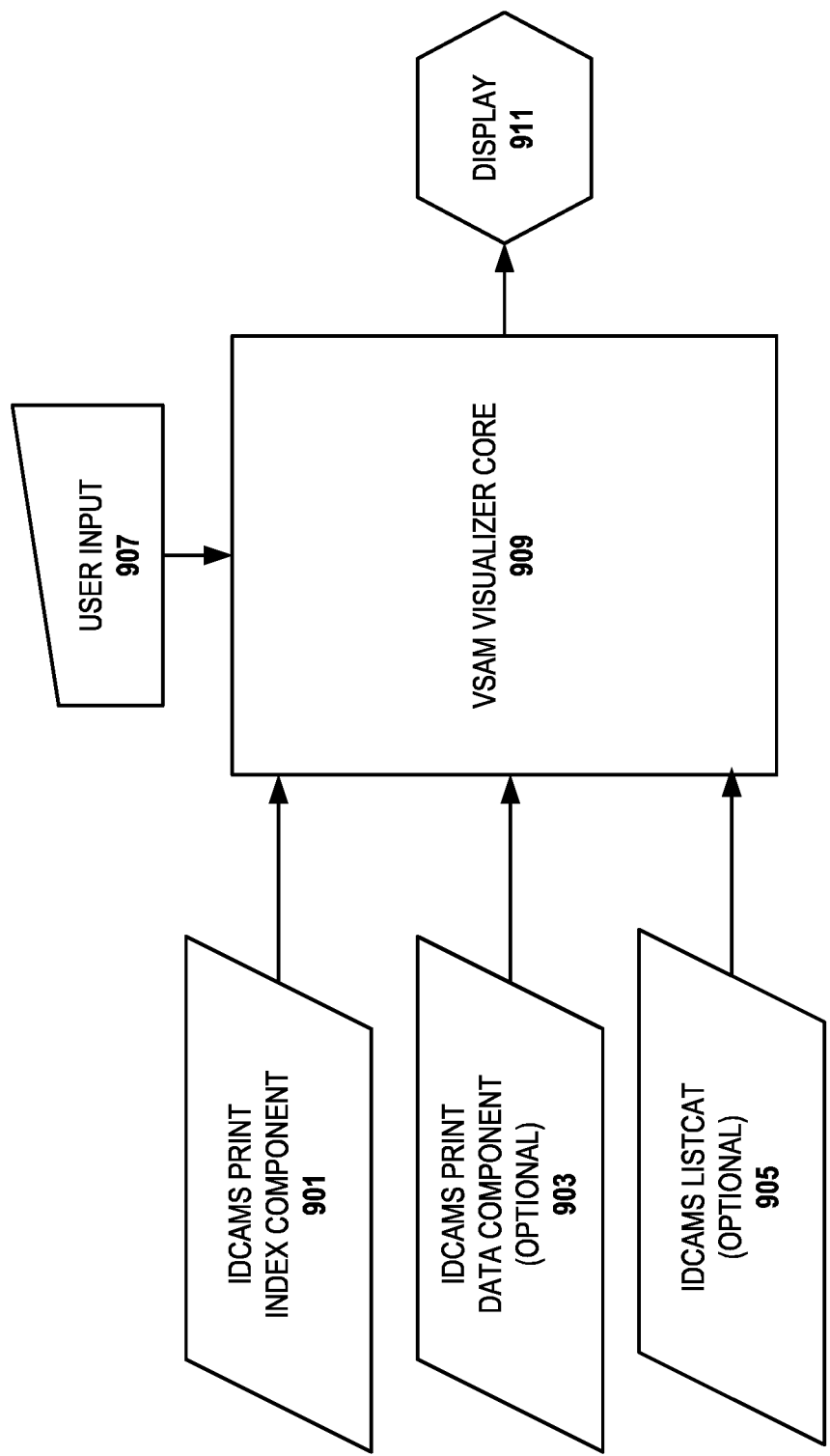
FIG. 9 is a diagram of a computer environment in which a preferred embodiment of the invention may be implemented.

The "remote" mode is illustrated in FIG. 9 and is most easily implemented on a workstation, such as a PC/MAC/Linux computer. However, as discussed above, the remote mode could also be implemented in a z/OS or MVS version. This embodiment of the invention uses representative data to build an internal model of the data set rather than read the data set directly from the storage device. In preferred embodiments of the invention, the inputs for the visualizer would be the index information 901. The information can be derived from an IDCAMS or DSS PRINT of the index component of the VSAM data set. A second input would be the data information 903 which can be derived from an IDCAMS or DSS PRINT of the data component of the VSAM data set. As was mentioned above, this input is optional in some embodiments of the invention. A third input of the information is catalog information 905, e.g., the information can come from an IDCAMS LISTCAT output for the VSAM data set. As is mentioned above, the catalog information is also optional in some embodiments of the invention. Together with the user input 907, the visualizer 909 takes the input 901, 903, 905 constructs a local model of the data structure and presents the user interface discussed above on a display 911.

Figure 10:
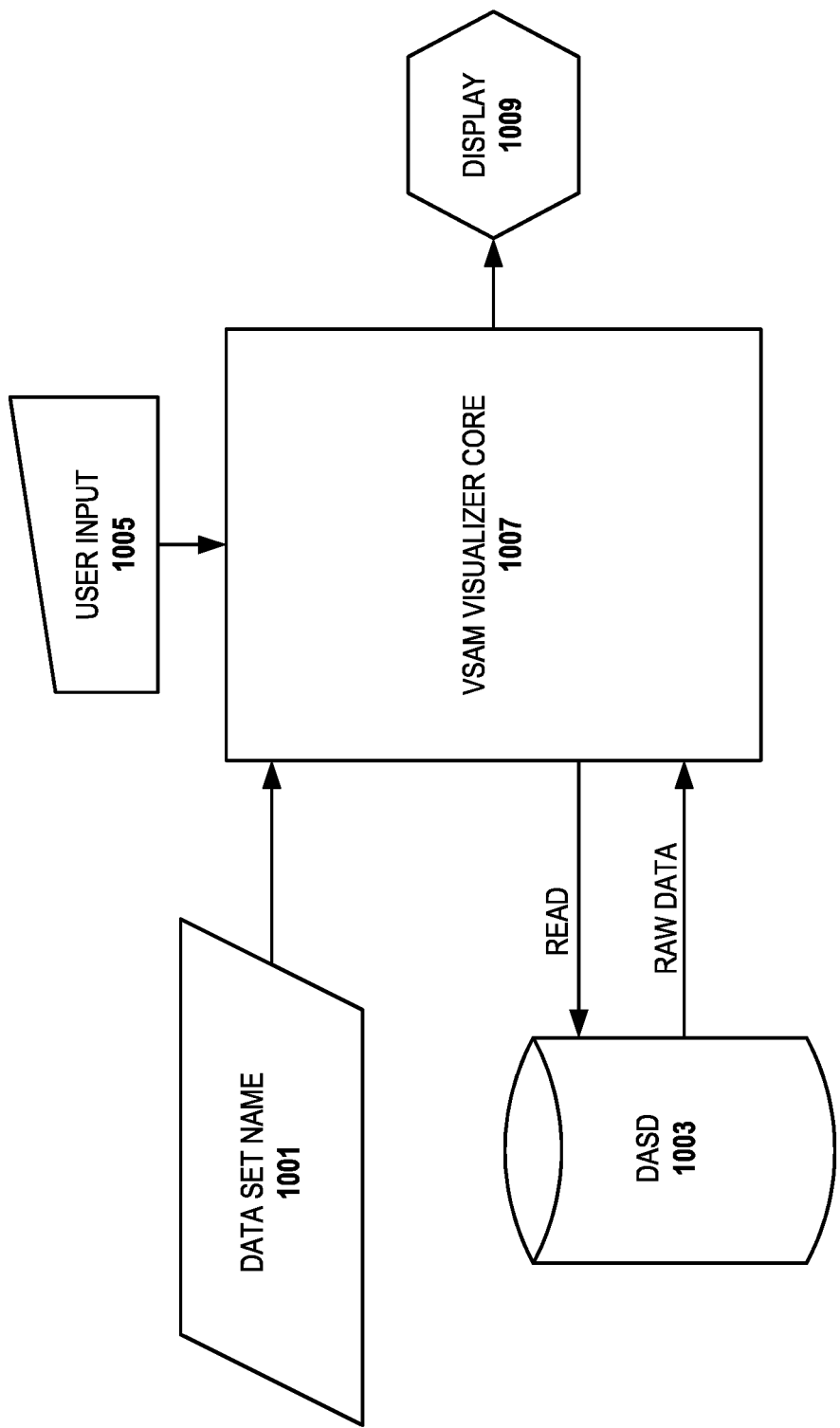
FIG. 10 is a diagram of a computer environment in which a preferred embodiment of the invention may be implemented.

The "local" mode is illustrated in FIG. 10 and could be most easily implemented on a mainframe system z/OS or MVS system such that direct VSAM program calls could be used to directly interface with the data set. This tool would run on the mainframe as an application and use the VSAM access method to access the data set. Users would access this tool through a remote connection to the mainframe, as they do for many tasks on the mainframe. "Local" mode could also be incorporated into a workstation such as a PC/MAC/Linux implementation, but would require additional interfaces to the mainframe system on which the data resides. The input for the "local" mode is a reference to the actual data set, either by the name of the VSAM data set, such as MY.VSAM.DATASET, or by a DD name, or any other method. The tool will use this information to access the data set directly. 1001. In different embodiments of the invention, the user simply inputs or otherwise requests the VSAM data set, e.g., by selecting from a menu. In response to the data set name, the visualizer 1007 reads the raw data from the DASD 1003, and displays the data in the graphical user interface on the display 1009 for the user.

Figure 11:
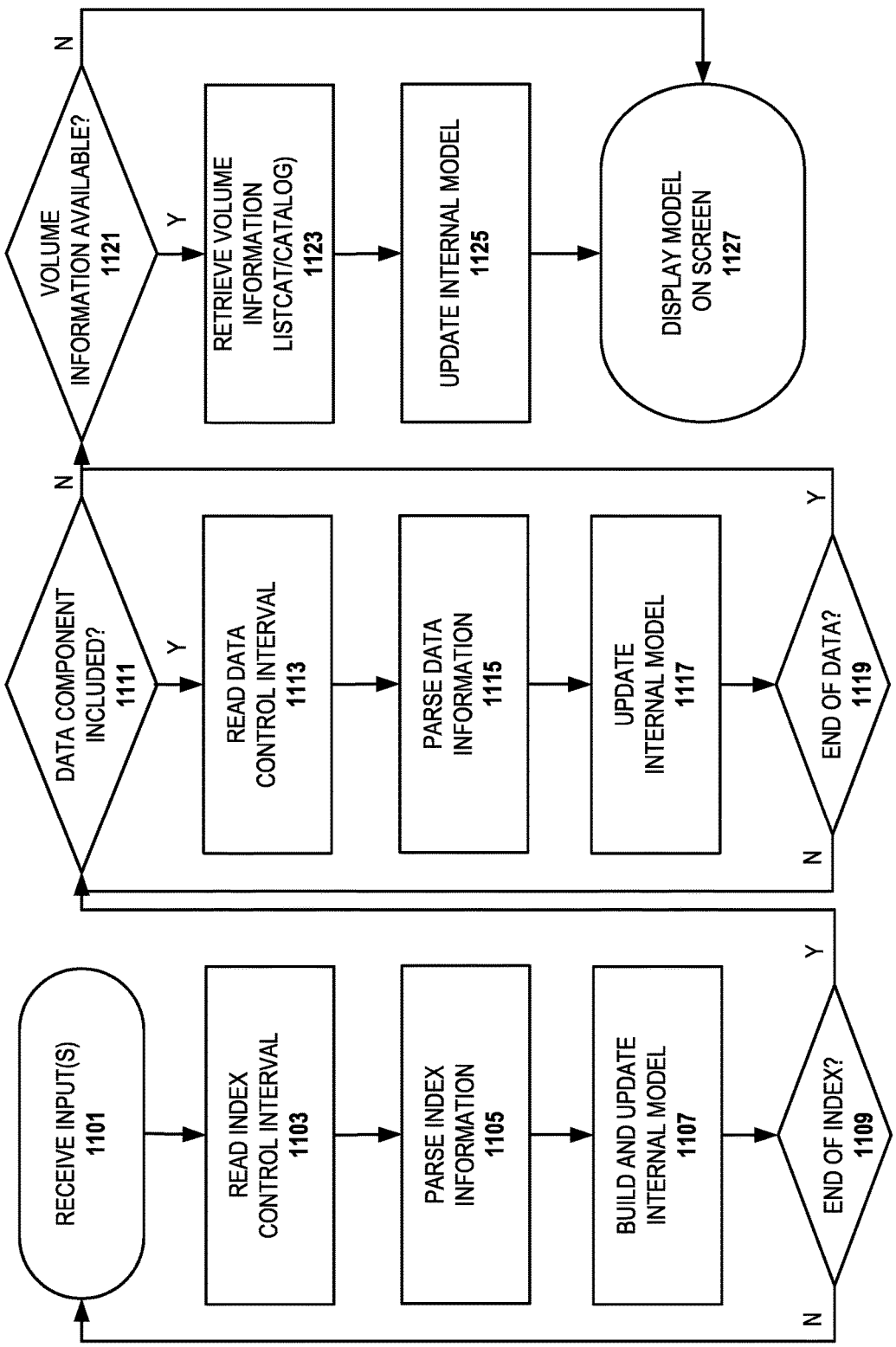
FIG. 11 is a flow diagram of building a graphical user interface according to an embodiment of the invention.

A method for building the graphical user interface in a preferred embodiment of the invention is shown in FIG. 11. At a high level, in this embodiment, the system reads the inputs, e.g., the index, data set and catalog information, and constructs an internal model of the VSAM index structure. This model is then used for all user-interaction tasks. In step 1101, as the method starts, the system would receive, i.e. open and read, the input data as selected by the user. In step 1103, the index control interval data is read from the retrieved index information. In the remote embodiment, for example, the index information can come from an IDCAMS INDEX command. In step 1105, the retrieved index information is parsed for index structure information, such as CI number, Index level, and high keys associated with pointers. Next, in step 1107, the parsed index information is used to build up an internal model of the index information of the VSAM index structure. In step 1109, at test is performed to determine whether the end of the index has been reached. If not, the process returns to step 1101 to receive the inputs.

In step 1111, a test is performed to determine whether the data component information is included in the inputs. If so, in step 1113, the data set control interval data is read from the retrieved data information. In the remote embodiment, for example, the index information can come from an IDCAMS DATA command. In step 1115, the retrieved data set information is parsed for relevant record information, and the RBA that those records reside (CIDF and RDF are discarded in this case. The parsed data information is used to update the internal model of the index information of the VSAM index structure, step 1117. In step 1109, at test is performed to determine whether the end of the data set information has been reached. If not, the process returns to step 1111 to receive the additional data.

A test is performed in step 1121 to determine whether catalog/volume information was included in the set of inputs. If so, in step 1123, the volume/catalog information is retrieved and is used to update the internal model in step 1125. Finally, the graphical user interface is presented on the display in step 1127.

As is mentioned above, alternative embodiments of the invention do not require all of the inputs, however, if certain input information is unavailable, the graphical user interface will not include that information. For example, if running in "remote" mode, but the information of the data set, e.g., the data component, is not provided, then the internal model would exclude the actual data stored in the data set. Instead, the data portion would use representative blocks and record ranges, but not show the data that is in the real data set. Similarly, if the catalog information, e.g., volume information, was not included, then the "remote" mode would not be able to tie control intervals to a specific location on the volume (VOLSER CCHH), and so that information would be excluded from the graphical user interface. Even in embodiments of the invention which are capable of displaying the index, data set and catalog information in an interface as shown in FIGS. 3-8, the user can opt not to request all of the information, and so only the requested information is displayed in the interface.

Figure 12:
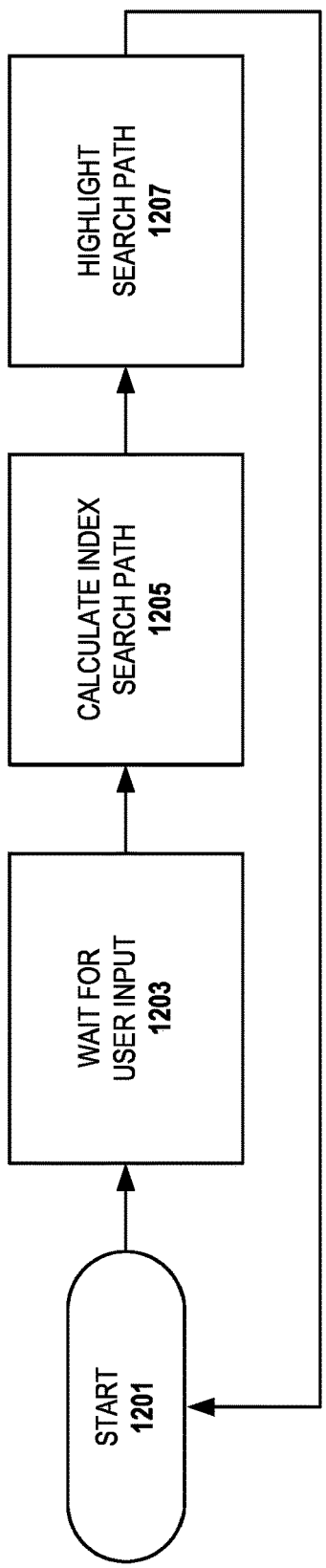
FIG. 12 is a flow diagram of user interaction with the graphical user interface according to one preferred embodiment of the invention.

User interaction with the interface is shown in FIG. 12. After constructing the graphical user interface, step 1201, as discussed above in relation to FIG. 11, the visualizer system waits for user input, step 1203. To answer questions, users would interact with the visualizer graphical user interface, e.g., by clicking on one of the many blocks displayed on the screen. In the index panel, these blocks represent the various logical index levels. When selected, the visualizer will do the calculation upward through the index levels to find the search path, step 1205. The tree elements that would be used to search to that particular block are highlighted, step 1207. Information about the highlighted block would also be displayed in the statistics information panel on the right side of the screen, step 1209. This user-interaction loops back to wait for additional user input. For example, other blocks could be selected, highlighting the search path for the selected block, a search function could invoked changing the display for the selected high key, the use could change the display of the data panel from logical to physical and so forth.

As is mentioned above, the information provided in the highlighted blocks and statistics panel provide information on remaining block capacity, and block location on disk, and so forth. If too many control intervals have a high percentage of storage used, parameters can be adjusted to accommodate more data in each block. The graphical user interface would also reveal "clumping" in the data set, so that new index parameters or reorganization will provide a more dispersed data indexing. Tracing the index search path to select portions of the index tree will reveal the key ranges associated with that block inside the logical index tree structure. This can be accomplished by clicking blocks in the interface or using the search feature. Problems within the index itself in the vertical and horizontal pointers are indicated by highlighting those index blocks with no reference from a higher level or horizontal level.

This is not a comprehensive list of how embodiments of the invention would allow users to make informed decisions, but provides a few example of the types of problems that this tool would allow the user to quickly and easily identify. As another example, the graphical user interface will also provide a way for users to quickly see empty or orphaned CAs. These empty or orphaned CAs can affect performance (and waste space), and so identifying them quickly can help diagnose performance issues. Data sets with large numbers of empty CAs are prime candidates for CA Reclaim, so this tool would help users identify data sets that would benefit from this additional feature in VSAM.

As is discussed above, the invention takes several pieces of data as input:

1. VSAM index information, e.g., using IDCAMS or DSS PRINT of VSAM INDEX commands 2. VSAM data set information, e.g., using IDCAMS or DSS PRINT of VSAM DATA component (optional)

3. VSAM catalog information, e.g., using IDCAMS LISTCAT (optional, but preferred)

The present invention has many advantages over the prior art. All relevant data structure information is in one location and easily visible without reading multiple reports or raw hex data. Problems that may not be obvious when looking at raw data will become apparent due to the visual nature of the tool. For example, space usage in the data storage is more understandable; reading raw data, it can be difficult to determine how much space is used, but in visual form, used space is apparent at a glance. Correlating a single data block to a location on disk requires much less effort than doing the arithmetic to convert RBA to an exact data position in a plurality of extents across multiple volumes.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for performing database maintenance comprising:
   receiving index information for data stored in a tree based file system running in a computer, the file system including a set of data blocks arranged in logical layers and a set of pointers within the set of data blocks which reference respective data blocks in different logical layers;
   parsing the index information;
   building a model of the file system based on the parsed index information;
   displaying a graphical user interface having an index panel in which ones of a plurality of icons respectively represent ones of the set of data blocks and are arranged in layers representing the logical layers
   detecting out of sequence keys in a storage block; and
   highlighting an icon in the graphical user interface in response to an out of sequence keys problem.

2. The method as recited in claim 1, further comprising responsive to user selection of a first icon representing a first data block, presenting an index path between respective data blocks according to a subset of pointers.

3. The method as recited in claim 1, further comprising:
   receiving data set information for the data stored in the tree based file system running in a computer;
   parsing the data set information;

updating the model of the file system based on the parsed data set information;
displaying a data panel in the graphical user interface having a plurality of icons which respectively represent ones of the set of data blocks.

4. The method as recited in claim 1, further comprising:
receiving catalog information for data stored in the tree based file system running in a computer;
parsing the catalog information;
updating the model of the file system based on the parsed catalog information;
displaying an information panel in the graphical user interface presenting information on a selected data block of the set of data blocks.

5. The method as recited in claim 1, wherein the index panel is a scrollable window and the graphical user interface presents information concerning which index layers are displayed in the index panel.

6. The method as recited in claim 2, further comprising:
detecting selection of an icon representing a selected data block in the index panel;
presenting an index chain in the index panel according to pointers associated with the selected data block; and
presenting the data panel so that an icon representing the selected data block is presented in the data panel.

7. The method as recited in claim 1, further comprising responsive to user input, reorganizing the data stored in the tree based file system.

8. The method as recited in claim 6, wherein the data stored in the tree based file system is a KSDS VSAM data set, wherein each layer has a plurality of index block icons, each index block icons representing a respective control interval.

9. Apparatus, comprising:
a processor;
computer memory holding computer program instructions executed by the processor for performing database maintenance, the computer program instructions comprising:
program code, operative to receive index information for data stored in a tree based file system running in a computer, the file system including a set of data blocks arranged in logical layers and a set of pointers within the set of data blocks which reference respective data blocks in different logical layers;
program code, operative to parse the index information;
program code, operative to build a model of the file system based on the parsed index information;
program code, operative to display a graphical user interface having an index panel in which ones of a plurality of icons respectively represent ones of the set of data blocks and are arranged in layers representing the logical layers;
program code, operative to detect out of sequence keys in a storage block;
and
program code, operative to highlight an icon in the graphical user interface in response to an out of sequence keys problem.

10. The apparatus as recited in claim 9, further comprising program code operative to present an index path between respective data blocks according to a subset of pointers and a selection of a first data block.

11. The apparatus as recited in claim 9, further comprising:
program code, operative to display a data panel in the graphical user interface having a plurality of icons which respectively represent ones of the set of data blocks, wherein the data panel is selectively displayed in a physical mode or a logical mode, wherein in the physical mode the plurality of icons are organized according to respective physical volumes in which the data blocks are stored and in the logical mode the plurality of icons are organized according to a pointer order of a set of pointers referring to the data blocks.

12. The apparatus as recited in claim 9, further comprising:
program code, operative to present a statistics panel including a size of a data block, a number of index levels and a percentage of storage used.

13. The apparatus as recited in claim 11, further comprising:
program code operative to detect selection of an icon representing a selected data block in the panel;
presenting the index panel so that an icon representing the selected data block is presented in the index panel; and
presenting an index chain in the index panel according to pointers associated with the selected data block.

14. The apparatus as recited in claim 11, wherein the index panel and the data panel are zoomable.

15. A computer program product in a non-transitory computer readable medium for use in a data processing system, the computer program product holding computer program instructions executed by the data processing system for performing database maintenance, the computer program instructions comprising:
program code, operative to program code, operative to receive index information for data stored in a tree based file system running in a computer, the file system including a set of data blocks arranged in logical layers and a set of pointers within the set of data blocks which reference respective data blocks in different logical layers;
program code, operative to parse the index information;
program code, operative to build a model of the file system based on the parsed index information;
program code, operative to display a graphical user interface having an index panel in which ones of a plurality of icons respectively represent ones of the set of data blocks and are arranged in layers representing the logical layers
program code, operative to detect out of sequence keys in a storage block; and
program code, operative to highlight an icon in the graphical user interface in response to an out of sequence keys problem.

16. The computer program product as recited in claim 15, further comprising program code operative to present an index path between respective data blocks according to a subset of pointers and a selection of a first data block.

17. The computer program product as recited in claim 15, further comprising:
program code, operative to display a data panel in the graphical user interface having a plurality of icons which respectively represent ones of the set of data blocks, wherein the data panel is selectively displayed in a physical mode or a logical mode, wherein in the physical mode the plurality of icons are organized according to respective physical volumes in which the data blocks are stored, and wherein in the logical mode the plurality of icons are organized according to a pointer order of a set of pointers referring to the data blocks.

18. The computer program product as recited in claim 15, further comprising:
- program code operative to detect selection of an icon representing a selected data block in the panel;
- presenting the index panel so that an icon representing the selected data block is presented in the index panel; and
- presenting an index chain in the index panel according to pointers associated with the selected data block.

19. The computer program product as recited in claim 15, wherein a broken index chain is presented the index panel showing a break between layers of the plurality of icons.

\* \* \* \* \*